J. H. STULL.
RAIL JOINT.
APPLICATION FILED OCT. 3, 1917.
1,268,296.
Patented June 4, 1918.
3 SHEETS—SHEET 1.
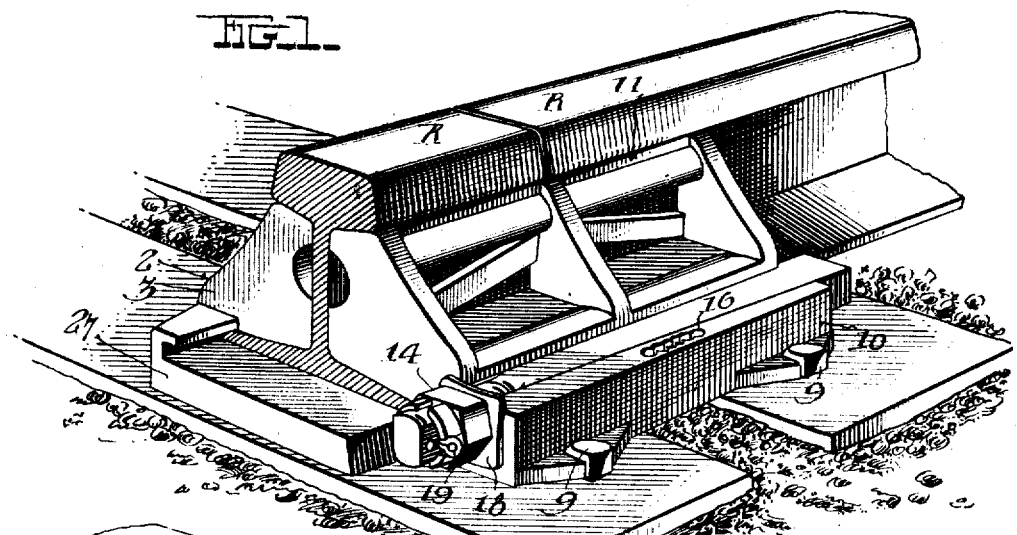
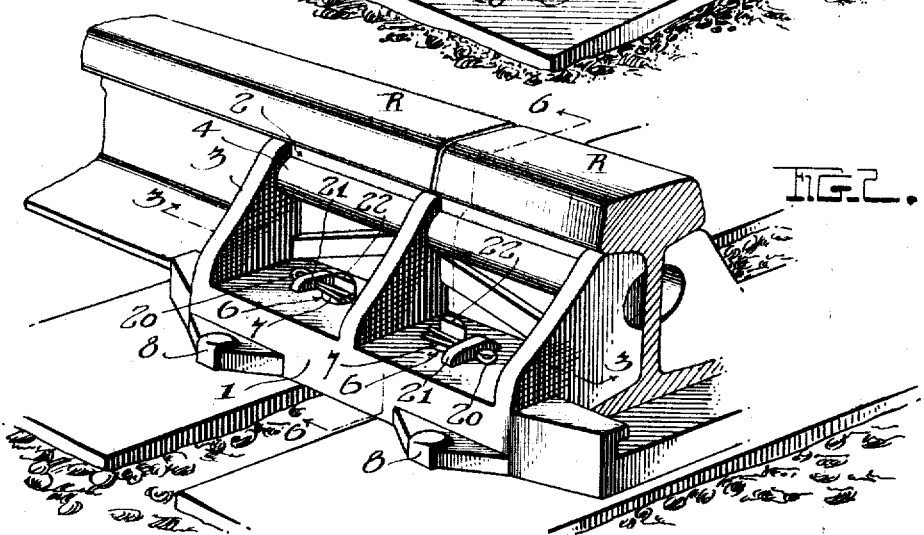
Witness
H. Woodard
Inventor
J. H. Stull
By H. B. Willson & Co
Attorneys

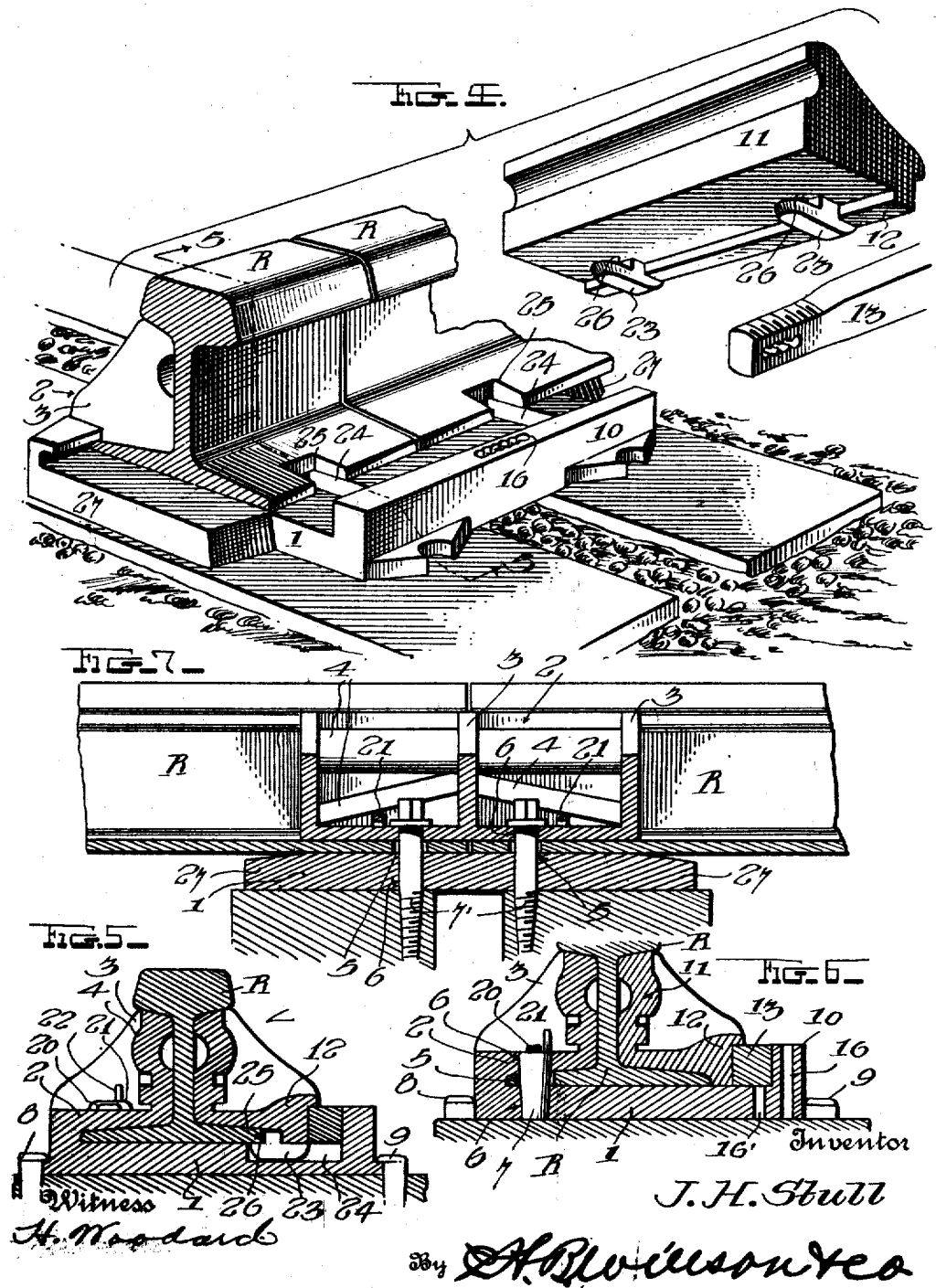

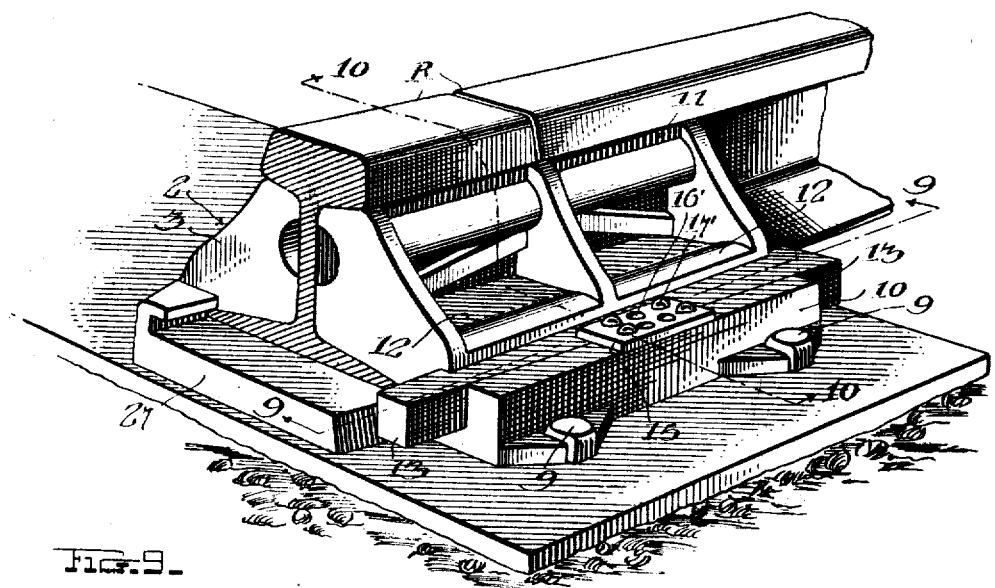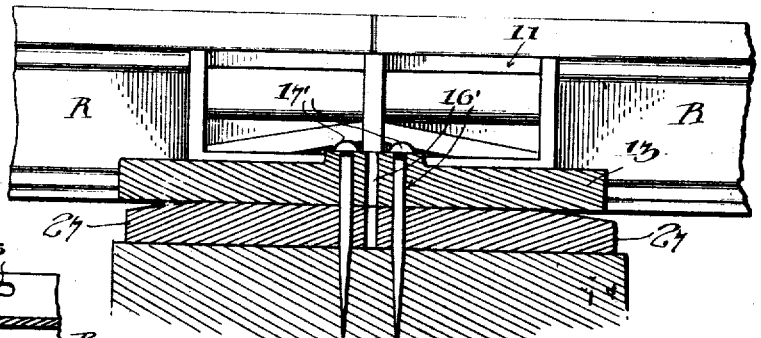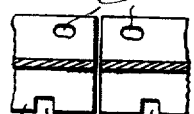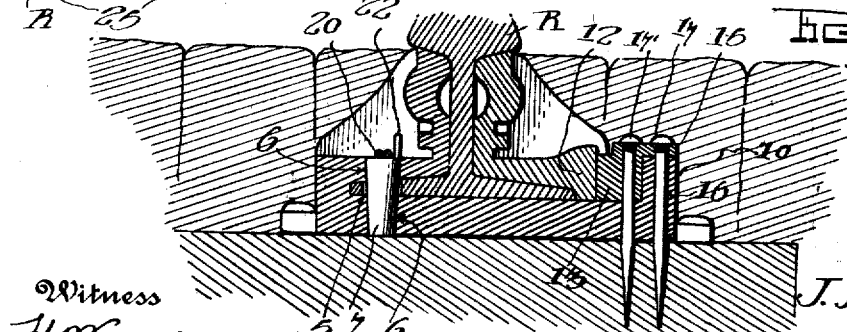

UNITED STATES PATENT OFFICE.

JACOB H. STULL, OF FREMONT, OHIO.

RAIL-JOINT.

1,268,296.　　　　Specification of Letters Patent.　　Patented June 4, 1918.

Application filed October 3, 1917.　Serial No. 194,523.

*To all whom it may concern:*

Be it known that I, JACOB H. STULL, a citizen of the United States, residing at Fremont, in the county of Sandusky and State of Ohio, have invented certain new and useful Improvements in Rail-Joints; and I do declare the following to be a full, clear, and exact description of the invention, such as will enable others skilled in the art to which it appertains to make and use the same.

My invention has for its object to provide a comparatively simple and inexpensive, yet a highly efficient and durable joint for railway rails, provision being made whereby the device may be used either on one or two ties to equal advantage, and whereby the necessary expansion and contraction of the rails is permitted.

With the foregoing general object in view, the invention resides in the novel features of construction and unique combinations of parts to be hereinafter fully described and claimed, the descriptive matter being supplemented by the accompanying drawings which form a part of this specification and in which:—

Figure 1 is a perspective view of the improved rail joint in use upon a pair of ties;

Fig. 2 is a view similar to Fig. 1, but showing the opposite side of the device;

Fig. 3 is a longitudinal section on the plane of the line 3—3 of Fig. 2;

Fig. 4 is a disassembled perspective view;

Fig. 5 is a transverse section on the plane of the line 5—5 of Fig. 4;

Fig. 6 is a similar view on the line 6—6 of Fig. 2;

Fig. 7 is a view similar to Fig. 3 but illustrating screw spikes in place of the tapered pins shown in said last named figure.

Fig. 8 is a perspective view of the joint in use upon a single tie;

Fig. 9 is a longitudinal section on the plane of the line 9—9 of Fig. 8;

Fig. 10 is a transverse section on the plane indicated by the line 10—10 of Fig. 8; and Fig. 11 is a detail horizontal section showing more particularly the arrangement of openings and notches in the faces of the rail.

In the drawings above briefly described, the numeral 1 designates a horizontal base plate having an L-shaped fish plate 2 joined integrally with one of its side edges, said fish plate being braced by transverse webs 3 and by suitable longitudinal ribs 4.

The meeting ends of a pair of rails R are adapted to rest on the base plate 1 with the fish plate 2 engaging one side thereof. The bases of the rails are formed with elliptical openings 5 which aline vertically with openings 6 formed through the horizontal flange of the fish plate 2 and through the base plate 1 as shown most clearly in Figs. 3 and 7. Tapered pins 7 (Fig. 3) or screw spikes 7' (Fig. 7) may be passed through these alined openings to prevent endwise creeping of the rails, but it will be clear that the elliptical openings 5 are of such dimensions as to permit slight longitudinal shifting of the rails under expansion and contraction. When the screw spikes 7' are utilized, they not only serve to secure the rails in the joint, but they act to assist in anchoring the entire joint to the ties and thus no spikes need be used on the edge of the base plate, adjacent said screw spikes. When, however, the pins 7 are employed, spikes 8 such as are commonly employed, are used to hold the adjacent edge of the base plate in contact with the ties.

The edge of the base plate 1, opposite the fish plate 2, is preferably spiked to the ties in all cases, by suitable spikes such as those indicated at 9, and the upper side of said plate is provided with a rib 10 which extends along said edge, in spaced relation to the bases of the rails. A second and detachable fish plate 11 engages the sides of the rails, opposite those with which the fish plate 2 contacts, said detachable fish plate having a thickened base flange 12 between which and the rib 10, a suitable wedge 13 is driven to hold the detachable fish plate in proper position. The wedge 13 may be held in operative position by any suitable means. For instance, one end of said wedge may be threaded to receive a nut 14 as shown in Fig. 1, or, as depicted more particularly in Figs. 8, 9 and 10, the wedge in question may be provided with a horizontal flange 15 overlying the rib 10, the two being formed with vertically alined openings 16 through which spikes 17 are driven into the tie, to prevent movement of the wedge after it is once driven home. Also, the wedge and the base plate may be provided with vertically alined openings 16' through which additional spikes 17' are driven, these spikes also extending into the tie so that they assist in securing the entire device thereto. When the nut 14 is utilized, a suitable spring washer 18 or other suitable device is preferably used as shown in Fig. 1 to exert a constant tightening action upon the wedge, and in most cases, a cotter pin or the like 19 is provided for locking the nut against possible removal.

Similarly, any preferred means could well be employed for holding the tapered pins 7 against removal, but cotter pins 20 preferably pass through lugs 21 on the fish plate 2 for this purpose, said cotter pins overlying the pins 7 as shown clearly in Figs. 2 and 3. These pins 7 are preferably provided with vertical extensions 22 on their upper ends, whereby they may be easily removed when the cotter pins 20 are withdrawn.

The fish plate 11 is in all cases provided with transverse depending lugs 23 which project into recesses 24 formed in the upper side of the base plate 1, said lugs extending through notches 25 in the edge of the rail bases, remote from that having the openings 5. By this feature of construction, it will be obvious that further anchorage against longitudinal creeping is obtained. The inner ends of the lugs 23 are preferably formed with notches 26 into which the edges of the rail bases are received as will be clear from Figs. 4 and 5. This detail of construction prevents any possibility of the detachable fish plate 11 being displaced by vibration or by the movement of the rails under expansion and contraction.

The improved joint may be employed either upon one or two ties, as occasion may demand, and in order that it may readily span a pair of such ties, the ends of the plate are provided with extensions 27 which may well decrease in thickness toward their outer ends, as the strain at such ends is slight. Wherever possible, the device will be mounted upon one tie only, since the simplest form of the wedge 13 may then be utilized as indicated in Figs. 8, 9 and 10. Furthermore, the spikes 17 and 17' which secure this wedge in place, also assist in anchoring the entire joint to the tie. This form of the invention is intended principally for use upon streets in which the ties are placed below the surface, (see Fig. 10) but I wish it understood that it could also be used wherever applicable.

From the foregoing, taken in connection with the accompanying drawings, it will be obvious that although my invention is of comparatively simple and inexpensive construction, it will be highly efficient and durable for the purposes intended. Since probably the best results are obtained from the several specific details shown and described, these details constitute the preferred form of the device, but I wish it understood that within the scope of the invention as claimed, numerous minor changes may well be made.

I claim:

1. A rail joint comprising a horizontal base plate having an L-shaped fish plate formed integrally with one of its edges, said base plate and the horizontal flange of the fish plate having vertically alined openings with which openings in the rail bases are adapted to register, tapered pins for passage through said alined openings, lugs rising from the horizontal flange of said fish plate, and locking pins passing horizontally through said lugs and overlying said tapered pins; together with a second and detachable fish plate operatively associated with said base plate for holding the rails in place.

2. A rail clamp comprising a horizontal base plate having an integral fish plate on one edge to abut one side of the rail, the upper side of said base plate, near the other edge thereof, having sockets, a second and L-shaped fish plate whose horizontal flange overlies the last named edge portion of said base plate, lugs depending from said flange into said sockets and adapted for reception in notches in the rail bases, said lugs having notches to receive the edges of said bases; together with means for securing said second fish plate in respect to said base plate.

3. A rail clamp comprising a horizontal base plate having an L-shaped fish plate formed integrally with one of its edges, said base plate and the horizontal flange of said fish plate having vertically alined openings with which openings in the rail bases are adapted to register, fasteners for passage through said alined openings, a detachable L-shaped fish plate whose horizontal flange overlies the edge of the base plate opposite the first named fish plate, said base plate having sockets in its upper side and located adjacent said last named edge, lugs depending from said detachable fish plate into said sockets and adapted for passage through notches in the rail bases, the inner ends of said lugs having notches into which the bases are adapted to extend, and means for securing said detachable fish plate in operative position.

4. A rail clamp comprising a horizontal base plate having an L-shaped fish plate formed integrally with one of its edges and a longitudinal rib formed integrally with and rising from its other edge, said base plate and the horizontal flange of said fish plate having vertically alined openings with which openings in the rail bases are adapted to register, fasteners for passage through said alined openings, a detachable L-shaped fish plate whose horizontal flange overlies said base plate between the rails and said longitudinal rib, said base plate having sockets in its upper side located beneath said detachable fish plate, lugs depending from said detachable fish plate into said sockets and adapted for passage through notches in the rail bases, said lugs having notches into which the edges of said bases are adapted to extend, a wedge driven between said rib and said detachable fish plate, and a horizontal flange on said wedge overlying said rib, said flange and rib having openings for registration to receive a driven fastener.

In testimony whereof I have hereunto set my hand in the presence of two subscribing witnesses.

JACOB H. STULL.

Witnesses:
B. A. FOUCHE,
JOSEPH T. YECKLEY.